June 6, 1972     J. W. ENDRESS ET AL     3,667,860
DIFFUSER VALVE MECHANISM FOR CENTRIFUGAL GAS COMPRESSOR
Filed March 13, 1970     6 Sheets-Sheet 1

*INVENTORS.*
JAMES W. ENDRESS
BY EDSON H. BYRNS
    CARL M. ANDERSON

D. Emmett Thompson
ATTORNEY

INVENTORS.
JAMES W. ENDRESS
EDSON H. BYRNS
CARL M. ANDERSON
BY
D. Emmett Thompson
ATTORNEY

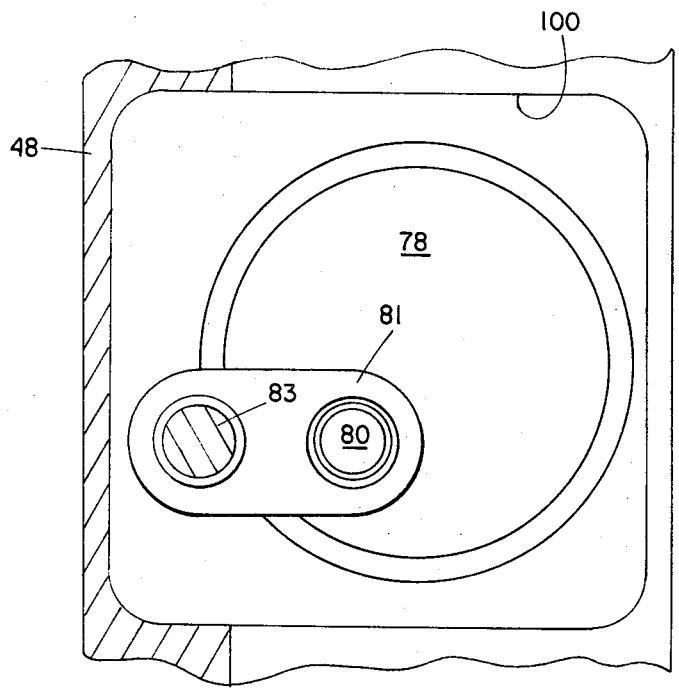
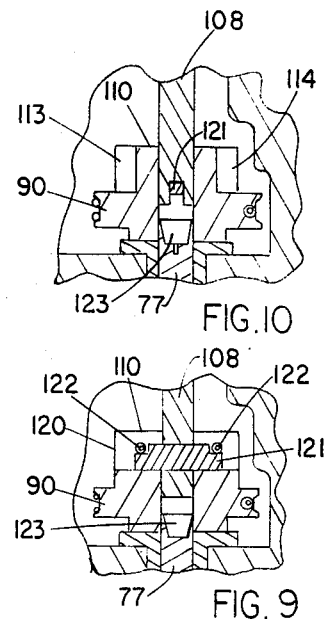
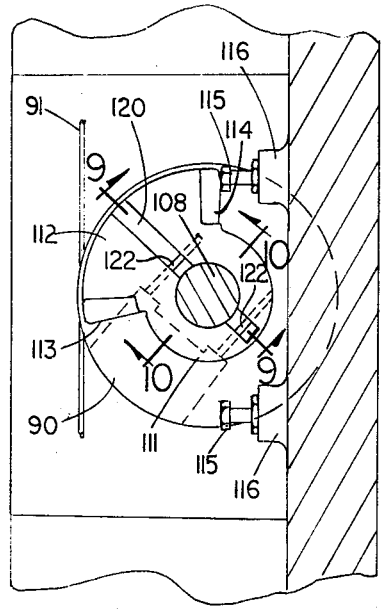
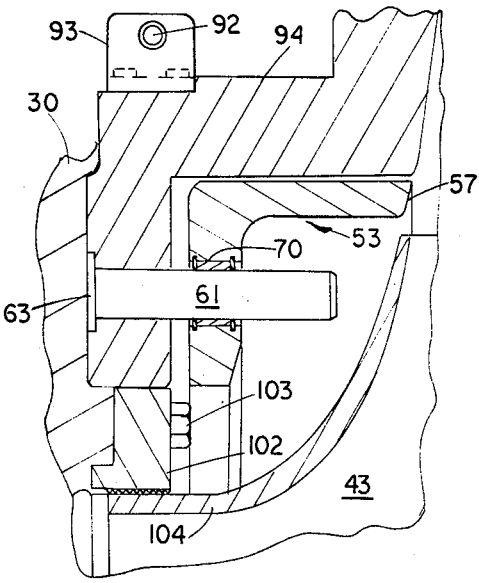
FIG. 6
FIG. 10
FIG. 9
FIG. 7
FIG. 8
INVENTORS.
JAMES W. ENDRESS
EDSON H. BYRNS
CARL M. ANDERSON
BY D. Emmett Thompson
ATTORNEY United States Patent Office 3,667,860
Patented June 6, 1972

3,667,860
DIFFUSER VALVE MECHANISM FOR
CENTRIFUGAL GAS COMPRESSOR
James W. Endress, Syracuse, Edson H. Byrns, Fayetteville, and Carl M. Anderson, Syracuse, N.Y., assignors to Carrier Corporation, Syracuse, N.Y.
Filed Mar. 13, 1970, Ser. No. 19,200
Int. Cl. F04d 15/00, 27/00
U.S. Cl. 415—150
7 Claims

ABSTRACT OF THE DISCLOSURE

An annular support member is fixedly mounted concentrically of the impeller and has an annular surface forming one side wall of the diffuser passage. A sleeve valve is mounted at the bore of the support member for movement transversely of the diffuser passage. A valve actuating mechanism is carried by the support member and operable exteriorly of the machine casing for moving the valve transversely of the diffuser passage. The valve actuating mechanism includes a plurality of crankshafts journaled for rotation in the support. A drive shaft is provided to effect rotation of the crankshafts in unison, the drive shaft having an end portion extending exteriorly of the machine casing.

BACKGROUND OF THE INVENTION

It is common practice to incorporate diffuser valve structures in centrifugal gas compressors for controlling the capacity of the machine and to prevent undue surging. Conventionally, such valve structures include a substantial number of parts and components mounted in different areas of the machine requiring a number of machining operations on the compressor casing and requiring a substantial assembly cost. Also, in most arrangements, parts of the valve operating mechanism are mounted in the diffuser passage of the compressor stage being controlled; or in multistage machines, the actuating or control mechanisms extend into a diffuser passage of an adjacent stage.

This invention has as an object a diffuser valve unit including an operating mechanism which is assembled prior to the installation of the unit in the machine, the unit embodying a particularly compact structural arrangement with no parts or components extending into the diffuser passage other than the sleeve valve proper.

SUMMARY OF THE INVENTION

An annular support member is mounted in the casing of the machine as by being bolted therein. The sleeve valve is carried by the support member, and also all the actuating mechanisms for moving the valve transversely of the diffuser passage. The actuating mechanism consists of a plurality of crankshafts journaled in the support and connected together by motion transmitting means, whereby the crankshafts are operated in unison. Rotation is imparted to the crankshafts by means of a drive shaft extending outwardly through the casing of the machine for connection to a suitable prime mover.

BRIEF DESCRIPTION OF THE DRAWINGS

FIG. 6 is a view taken on line 6—6 of FIG. 4;

FIG. 7 is a view taken on line 7—7 of FIG. 4;

FIG. 8 is a view taken on line 8—8 of FIG. 2;

FIG. 9 is a view taken on line 9—9 of FIG. 7; and

FIG. 10 is a view taken on line 10—10 of FIG. 7.

DESCRIPTION OF THE PREFERRED EMBODIMENT

Figure 1:
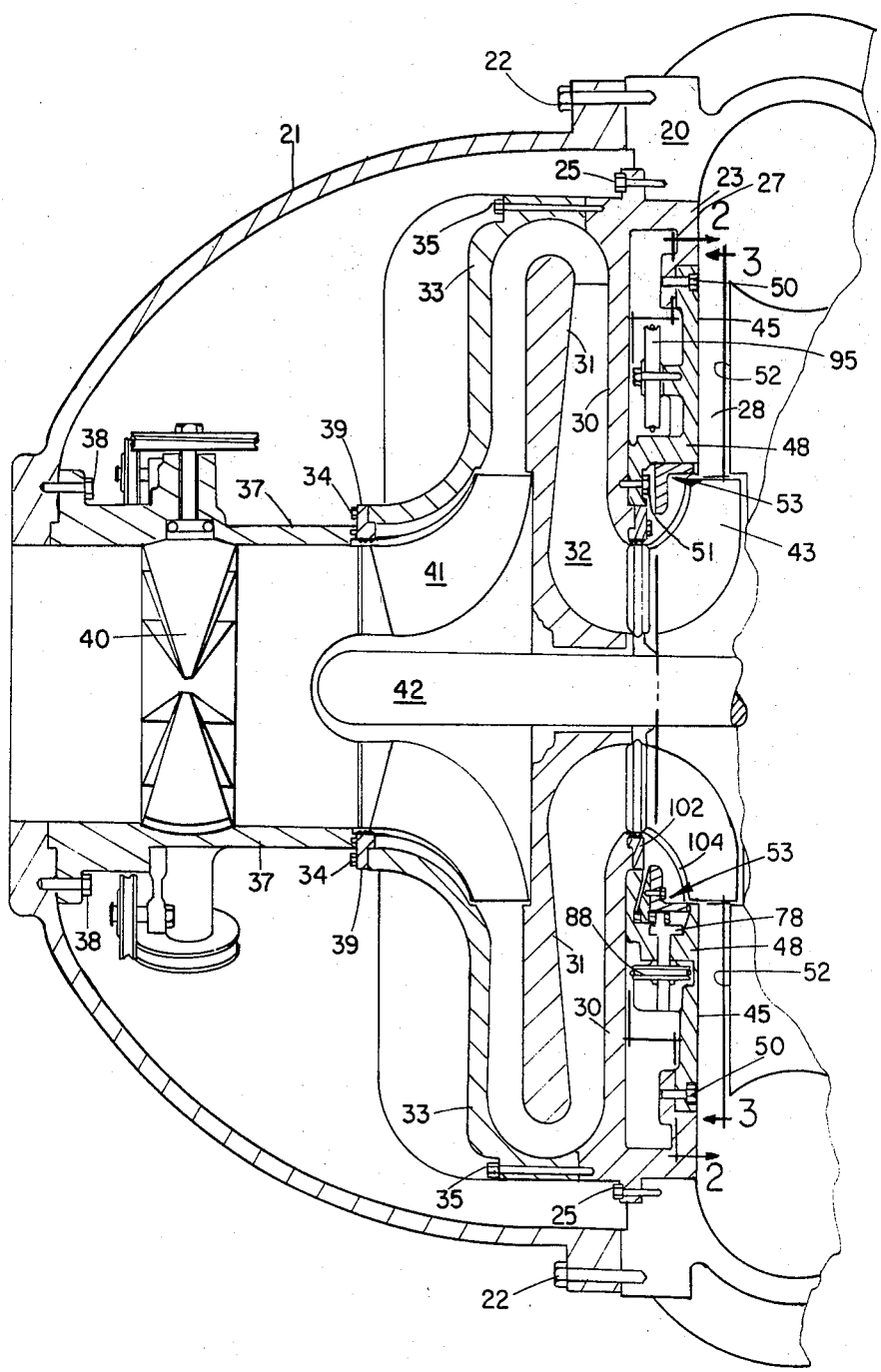
FIG. 1 is a cross-sectional view of a two-stage centrifugal compressor embodying our invention, the view taken on a line corresponding to line 1—1 of FIG. 2.

Referring to FIG. 1, the invention is illustrated as being incorporated in a two-stage centrifugal gas compressor. The compressor in general is of conventional form including a casing 20 to which there is attached a front section 21 as by cap screws 22. A section 23 is attached to the casing 20 by screws 25. The sections 23 is formed with an annular surface 27 forming the outer portion of one wall of the diffuser passage 28. The section 23 is also formed with diaphragm portions 30, 31 which are connected by a series of vanes 32. A diaphragm section 33 is attached to the section 23 by bolts 35.

The outer end of the front section 21 is formed with a large central inlet opening. An inwardly extending cylindrical member 37 is attached to the section 21 as by screws 38. The inner end of the member 38 has a slip joint connection with a labyrinth seal 39 attached to the outer end of the diaphragm 33 as by screws 34. The portion 37 forms an inlet passage to the compressor, and is provided with a guide vane structure 40 of conventional arrangement for modifying the inflow of gas to the compressor. An impeller 41 is fixedly mounted on a drive shaft 42 and is positioned intermediate the diaphragms 31, 33, this arrangement constituting the first stage of the compressor. An impeller 43 is mounted on shaft 42 and arranged for the reception or gas discharged by the impeller 41 through the passage formed by the diaphragms 30, 31, and 33. Gas is discharged from the second stage impeller 43 through the diffuser passage 28. As previously stated, the surface 27 of section 23 forms the outer portion of one wall of the diffuser passage 28. The inner portion of this wall is formed by an annular side surface 45 of an annular support member 48, the peripheral portion of which is received in a circular recess formed in the member 23 (see FIG. 4). The support member 48 is attached to section 23 by screws 50 (see FIGS. 1 and 5). The inner portion of the support member is attached to the inner portion of the diaphragm 30 by cap screws 51. The opposite side wall 52 of the diffuser passage 28 is formed by section 20.

A diffuser sleeve valve indicated generally at 53 is located in the inner portion of the support member 48. The diffuser valve is of right-angular form in cross section having a cylindrical flange 57 (see FIGS. 4 and 5) disposed parallel to the axis of shaft 42 and located intermediate the periphery of the second stage impeller 43, and the inner end of the diffuser passage 28. The inwardly extending flange portion 60 of the diffuser valve is slidably mounted on pins 61 (see FIG. 8) mounted in the inner portion of the support 48. The guide pins 61 are located in apertures formed in the support member and have enlarged head portions 63 located in circular recesses formed on the inner side of the support member, the heads being retained in the recess by the abutting surface of the diaphragm 30. The flange 60 of the diffuser valve is provided with bearings 70 encircling the guide pins 61. Three guide pins 61 are employed (see FIGS. 2 and 3).

Figure 2:
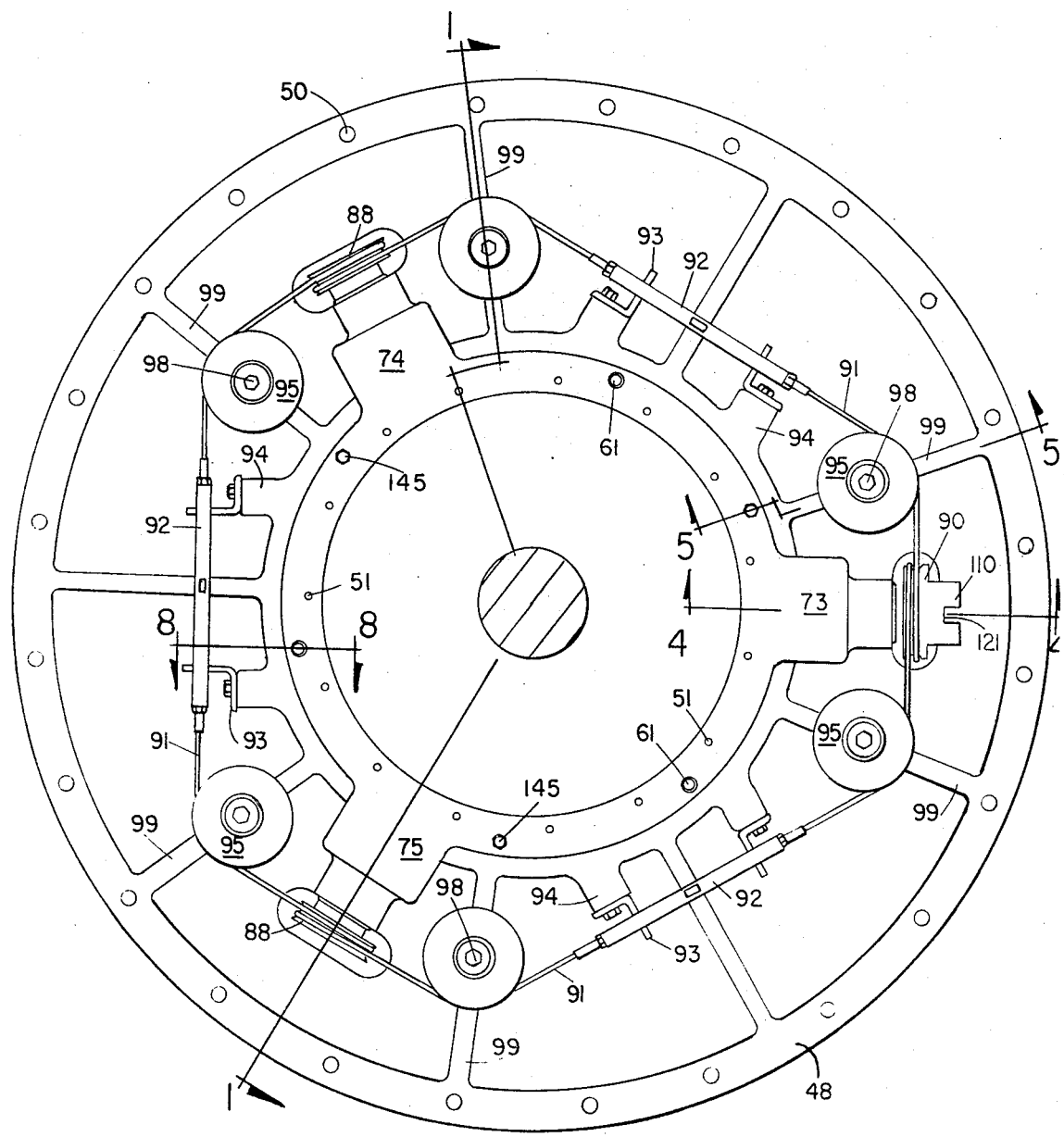
FIG. 2 is a transverse sectional view taken on a line corresponding to line 2—2 of FIG. 1, the view showing the inner side of the diffuser valve supporting member and the valve operating arrangement.
Figure 3:
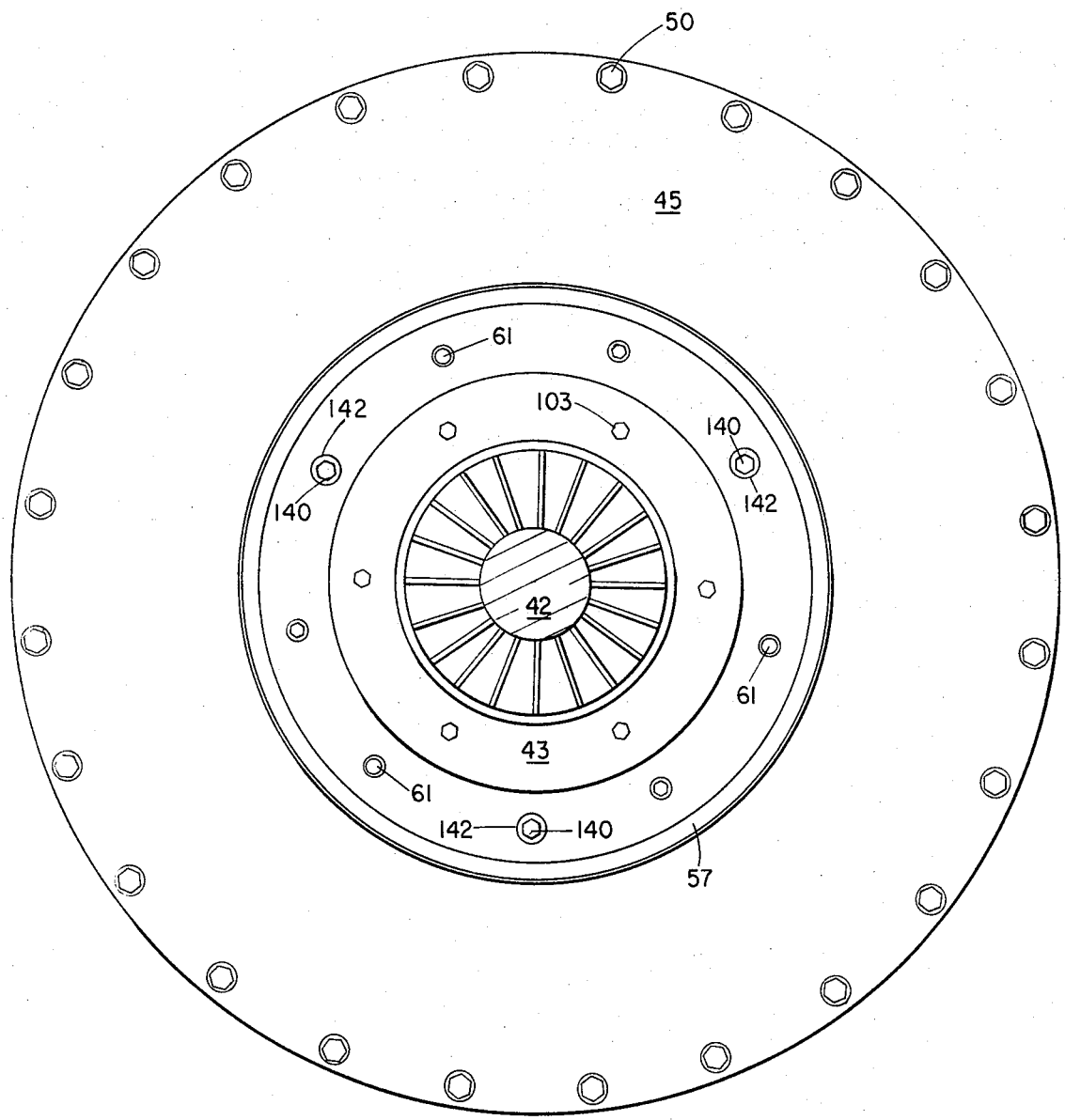
FIG. 3 is a view taken on line 3—3 of FIG. 1 showing the outer side of the valve supporting member.
Figure 4:
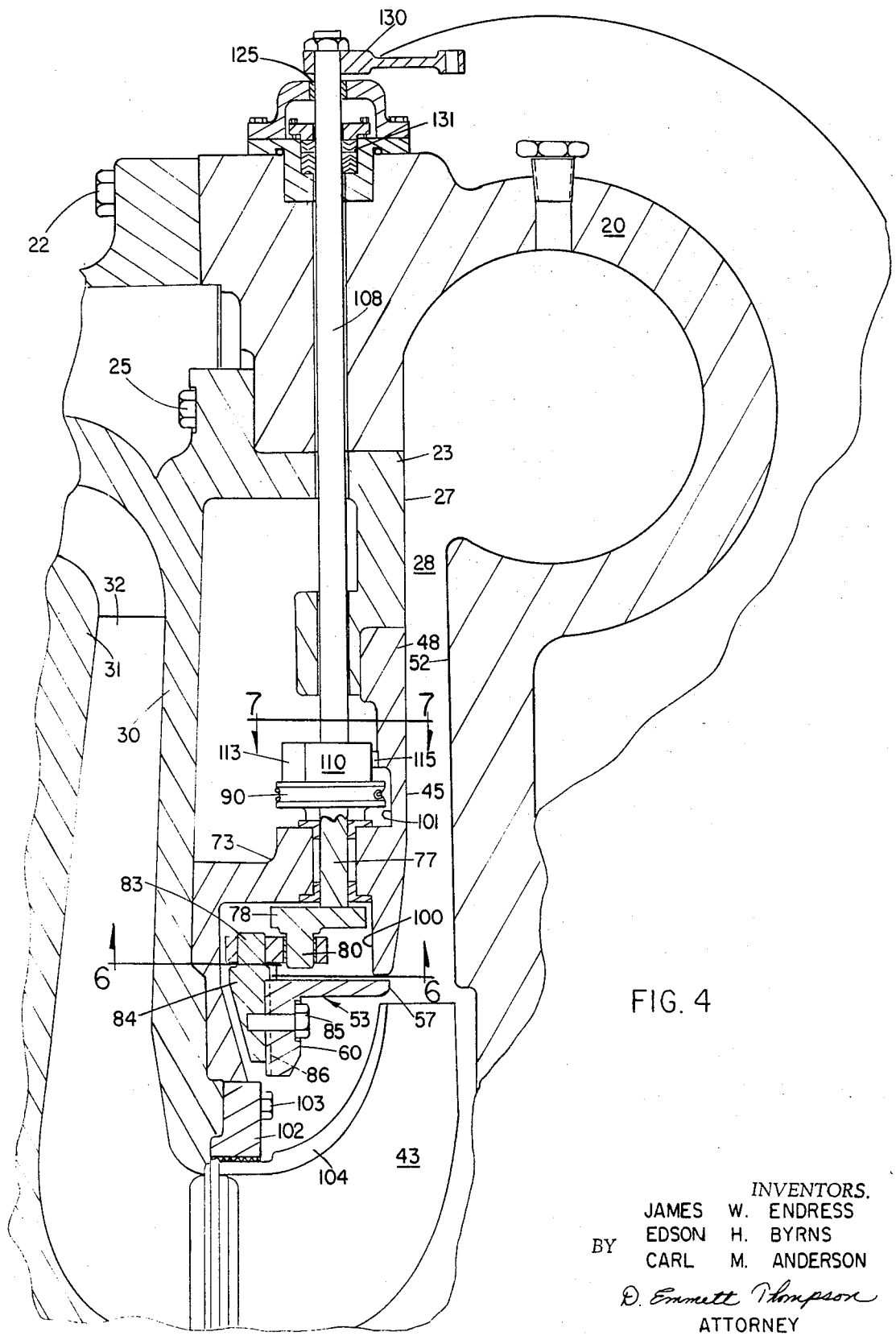
FIG. 4 is an enlarged sectional view as indicated by line 4—4 of FIG. 2, the view extending outwardly through the compressor casing.

As previously stated, and as shown in FIGS. 3 and 4, the outer surface of the support member 48 extending radially outwardly from the diffuser valve 53 to the section 23 forms the wall 45 of the diffuser passage 28. The rear or inner side of the support member is shown in FIG. 2. The support member is formed with three radially disposed bosses 73, 74, 75. A crankshaft 77 is journaled in the boss 73 (see FIG. 4). Similar crankshafts are journaled in the bosses 74, 75. A crank disc 78 is fixed to the inner end of each crankshaft and is provided with a crank throw 80 to receive a connecting link 81 which is also connected to a journal 83 formed on a member 84. The members 84 are fixedly secured to the flange 60 of the diffuser valve 53 as by cap screws 85 (see FIG. 4). The members 84 are formed with gibs positioned in slots 86 formed in the flange 60 of the diffuser valve, this arrangement serving to accurately locate and position the members 84 on the diffuser valve. A pulley 88 is fixed to the upper end of each of the crankshafts journaled in the bosses 74, 75. A pulley 90 is fixed to the upper end of the crankshaft journaled in the boss 73. A cable section 91 is wrapped about each of the pulleys 88, 90. The ends of the cable sections are connected to turnbuckles 92 which serve to tension the cable sections. The turnbuckles are mounted for sliding movement in brackets 93 mounted on bosses 94. The cable sections 91 are trained over idler pulleys 95 (see FIG. 2), each of which is journaled on a spacer sleeve 96 fixedly mounted on a boss 97 by cap screws 98. The bosses 97 are reinforced by ribs 99 (see FIGS. 2 and 5).

With this arrangement, when one of the shafts 77 (see FIG. 4) is rotated, all three of the shafts are rotated in unison. It will be apparent upon rotation of the shafts 77 the diffuser valve 53 is moved transversely across the diffuser passage 28 toward wall 52 and from the wall 52.

The lower portion of the support member 48 is formed with three recesses 100 to accommodate the crank discs 78 and the journal members 84 (see FIG. 4). Also, the rear surface of the support member is formed with recesses 101 to accommodate the pulleys 88, 90. A labyrinth seal member 102 is fixed to the innermost portion of the diaphragm 30 as by cap screws 103 (see FIG. 4). This seal cooperates with the periphery of the shroud 104 on the second stage impeller 43.

Means operable exteriorly of the casing 20 is provided for effecting rotation of the cranckshaft 77. Referring to FIG. 4, the casing 20 is formed with a radially disposed passage 107 to receive a drive shaft 108 which extends inwardly through clearance apertures formed in the support member 48. The inner end of the shaft 108 extends into the bore of an upward extension 110 of pulley 90. The major portion of the extension 110 is in the form of a cylindrical hub 111 (see FIG. 7). The remaining quadrant portion 112 is formed with shoulders 113, 114. These shoulders engage adjustable stop screws 115 threaded into bosses 116 formed on the support member.

The extension 110 is formed with a slot 120 extending diametrically of the extension. A key 121 is positioned in the slot 120 and is retained therein by pins 122. The lower end of the shaft 108 is bifurcated and positioned over the key 121 (see FIGS. 9 and 10). The upper end of each of the crankshafts 77 are slotted axially and provided with threaded tapered holes to receive threaded plugs 123 which, when threaded into the ends of the crankshaft, expand the same into fixed tight engagement with the pulleys 88, 90 (see FIG. 9). With this arrangement, the drive shaft 108 is coupled to the pulley 90 to effect rotation of the crankshaft 77; and, accordingly, by means of the cable sections 91, rotation in unison is imparted to the crankshafts connected to the pulleys 88. The opposite end of the drive shaft 108 extends outwardly through a bearing 125 in the casing 20 and is provided with a link 130 which is connected to power means to effect rotation of the shaft 108. A seal gland 131 is provided to prevent any escape of gas from the interior of the compressor.

Figure 5:
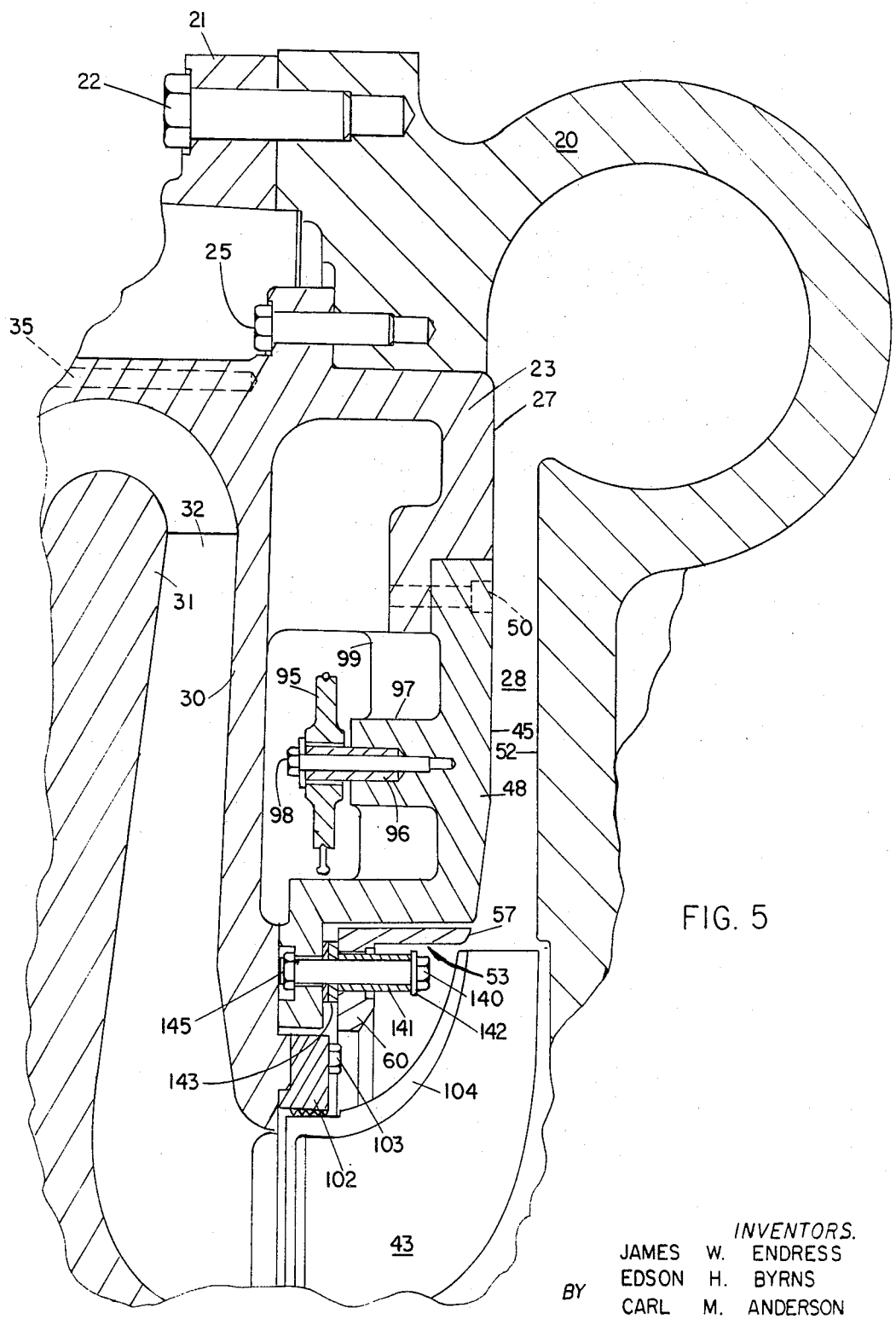
FIG. 5 is an enlarged view taken on line 5—5 of FIG. 2.

Means is provided to limit the extent of movement of the diffuser valve 53. Referring to FIG. 5, the flange 60 of the diffuser valve is formed with three apertures arranged in alignment with apertures formed in the inner portion of the support member 48. A bolt 140 is positioned in each aperture formed in the support member, the bolts extending outwardly through the diffuser valve flange 60. A spacer sleeve 141 is positioned on each of the bolts 140. The outer ends of the sleeves 141 are engaged by a washer 142 under the head of the bolt, and the opposite ends of the sleeves 141 engage washers 143. When the nuts 145 are tightened, the spacer sleeves 141 are clamped between the washers 142, 143. The washers 142 are engaged by the flange 60 of the valve when the valve is moved outwardly across the diffuser passage 28. When the valve is moved inwardly, it engages the washers 143. Accordingly, the washers 142, 143 serve as stop means to limit the extent of movement of the diffuser valve.

The diffuser valve 53 and the operating mechanism therefor is completely assembled and adjusted on the support member 48. This assembly is then attached to the section 23 by the screws 50, 103. The member 23 is then affixed to the casing section 20 by screws 25. Thereupon, the drive shaft 108 is inserted through the bearing 107 with the bifurcated end of the shaft engaging the key 121. It will be apparent that the assembly of this mechanism can be accomplished quickly and conveniently, also that the valve actuating mechanism contains no parts or components extending across the diffuser passage 27, whereby the diffuser valve and its operating mechanism disclosed is particularly well adapted for mounting in the last stage of a multistage centrifugal compressor. It will also be apparent that it can be mounted in a single stage compressor.

We claim:

1. A centrifugal gas compressor comprising a casing having an intake passage and an annular diffuser passage with spaced apart fixed side walls, an impeller journaled in the casing intermediate said passages, an annular support member, means detachably mounting said annular support member in said casing concentrically with said impeller, said support member having an axial dimension not exceeding the axial dimension of said impeller and having an annular side surface forming one side of said diffuser passage, said support member being fixed in the casing against movement relative to the opposite side wall of said diffuser passage, a cylindrical diffuser sleeve valve mounted on said support member, said diffuser sleeve valve being disposed intermediate the periphery of said impeller and said annular diffuser surface and being movable toward and from the other wall of said diffuser passage to regulate the flow of gas through said passage, and diffuser sleeve valve operating means encircling said diffuser sleeve valve and mounted on the opposite side surface of said support member and operable exteriorly of said casing for effecting movement of said valve.

2. A centrifugal gas compressor structure as set forth in claim 1 wherein said valve operating means includes a shaft disposed in a plane extending radially of said impeller and journaled in said support member, and motion transmitting means operatively connecting said shaft to said diffuser valve.

3. A centrifugal gas compressor as set forth in claim 1 and including a plurality of shafts disposed radially of said impeller and journaled in said support member, said shafts being operable upon rotation to effect movement of said diffuser valve, and means operable externally of said casing for rotating said shafts in unison.

4. A centrifugal gas compressor as set forth in claim 1 wherein said valve is slidably mounted on valve guiding and supporting means detachably mounted on said support member.

5. A centrifugal gas compressor as set forth in claim 1 and including stop means detachably mounted on said support member for limiting the extent of movement of said valve by said valve operating means.

6. A centrifugal gas compressor as set forth in claim 1 and including a circular series of radially disposed shafts journaled on the opposite side surface of said support, motion transmitting means connecting said shafts to said diffuser valve and operable upon rotation of said shafts to effect movement of said valve, means operable exteriorly of said casing to effect rotation of one of said shafts, and means interconnecting the other shafts of said series with said one shaft and operable to effect rotation of said other shafts in unison with said one shaft.

7. A centrifugal gas compressor as set forth in claim 1 wherein said valve operating means includes a circular series of shafts journaled in the opposite sides surface of said supporting member, said shafts being disposed radially about said valve and operably connected thereto, said shafts being operable upon rotation to effect movement of said valve toward and from the other wall of said diffuser passage, a drive shaft journaled in said casing and being operatively connected to one of said radially disposed shafts, said drive shaft extending outwardly through said casing for connection to actuating means.

References Cited

UNITED STATES PATENTS

| | | | |
|---|---|---|---|
| 2,861,774 | 11/1958 | Buchi | 415—150 |
| 3,160,392 | 12/1964 | Hunter | 415—151 |
| 3,251,539 | 5/1966 | Wolfe et al. | 415—150 |
| 3,289,919 | 12/1966 | Wood | 415—150 |
| 1,556,771 | 10/1925 | Dupont | 415—157 |
| 3,362,624 | 1/1968 | Endress | 415—150 |

FOREIGN PATENTS

| | | | |
|---|---|---|---|
| 305,214 | 1/1929 | Great Britain | 415—150 |
| 986,680 | 4/1951 | France | 415—158 |
| 582,042 | 2/1955 | Canada | 415—151 |
| 314,998 | 8/1956 | Switzerland | 415—150 |

HENRY F. RADUAZO, Primary Examiner

U.S. Cl. X.R.

415—158, 149